United States Patent
Platts et al.

(10) Patent No.: US 9,862,630 B2
(45) Date of Patent: Jan. 9, 2018

(54) UNDER-SINK WASTE PROCESSING UNIT

(71) Applicant: General Electric Company, Schenectady, NY (US)

(72) Inventors: Lauren Nicole Platts, Lafayette, IN (US); Joseph Emil Gormley, Louisville, KY (US); Rebecca Ann Alvord, Louisville, KY (US)

(73) Assignee: HAIER US APPLIANCE SOLUTIONS, INC., Wilmington, DE (US)

( * ) Notice: Subject to any disclaimer, the term of this patent is extended or adjusted under 35 U.S.C. 154(b) by 397 days.

(21) Appl. No.: 14/595,481

(22) Filed: Jan. 13, 2015

(65) Prior Publication Data

US 2016/0200616 A1    Jul. 14, 2016

(51) Int. Cl.
| | |
|---|---|
| *B01D 35/02* | (2006.01) |
| *C02F 9/00* | (2006.01) |
| *B01D 35/30* | (2006.01) |
| *C02F 11/16* | (2006.01) |
| *B02C 23/10* | (2006.01) |
| *E03C 1/266* | (2006.01) |
| *B02C 18/00* | (2006.01) |

(52) U.S. Cl.
CPC .......... *C02F 11/16* (2013.01); *B02C 18/0092* (2013.01); *B02C 23/10* (2013.01); *E03C 1/2665* (2013.01)

(58) Field of Classification Search
CPC ..... B02C 18/0092; B02C 23/10; C02F 11/16; E03C 1/2665; B01D 35/02
See application file for complete search history.

(56) References Cited

U.S. PATENT DOCUMENTS

| | | | | |
|---|---|---|---|---|
| 2,788,937 A | * | 4/1957 | Weiland | .................... B04B 1/08 494/27 |
| 3,300,150 A | * | 1/1967 | Sones | ..................... H02P 29/40 241/36 |
| 3,420,455 A | * | 1/1969 | Chorney | ............... E03C 1/2665 241/36 |
| 3,823,879 A | | 7/1974 | Johnson | |

(Continued)

FOREIGN PATENT DOCUMENTS

| | | |
|---|---|---|
| JP | 11207309 A | 8/1999 |
| KR | 101308905 B1 | 9/2013 |
| WO | WO 2006/109834 | * 10/2006 |

*Primary Examiner* — Ana Fortuna
(74) *Attorney, Agent, or Firm* — Dority & Manning, P.A.

(57) ABSTRACT

An under-sink waste processing unit may generally include a housing defining an inlet and an outlet. The inlet may be configured to receive water and waste discharged from a waste disposal. The housing may also define a separation chamber in fluid communication with the inlet and a processing chamber separate from the separation chamber. The waste processing unit may also include a rotatable drive shaft extending within the separation chamber and a screw thread associated with the drive shaft. The screw thread may be configured to be rotated with the drive shaft within the separation chamber so as to at least partially separate the water from the waste received within the inlet. The separated waste may be configured to be dispersed from the separation chamber into the processing chamber for further processing thereof.

20 Claims, 8 Drawing Sheets

(56) References Cited

U.S. PATENT DOCUMENTS

| | | | |
|---|---|---|---|
| 8,464,970 B2* | 6/2013 | Ceru | E03C 1/2665 241/100 |
| 8,726,803 B2 | 5/2014 | Ceccarelli | |
| 2011/0147499 A1* | 6/2011 | Ceru | E03C 1/2665 241/23 |
| 2014/0117126 A1* | 5/2014 | Ceru | B02C 23/36 241/23 |
| 2015/0048021 A1* | 2/2015 | Bates | E03C 1/2665 210/435 |
| 2016/0200616 A1* | 7/2016 | Platts | C02F 11/16 210/113 |

* cited by examiner

UNDER-SINK WASTE PROCESSING UNIT

FIELD OF THE INVENTION

The present subject matter relates generally to waste processing units to be used within an under-sink storage space and, more particularly, to an under-sink waste processing unit for further processing waste discharged from a waste disposal.

BACKGROUND OF THE INVENTION

Waste disposal units are typically used to process solid waste, such as food waste, garbage and/or other waste, into particulates small enough to pass through associated drain plumbing. A conventional waste disposal is configured to be mounted onto a sink drain extending downward from a corresponding sink such that water/waste discharged from the sink may be directed into the disposal. The water/waste is typically directed into a grind chamber defined above a cutting or grinding mechanism of the disposal. The grinding mechanism is coupled to a shaft of a corresponding motor to allow the grinding mechanism to be rotated at high speeds. The waste contained within the grind chamber is typically ground, shredded, cut and/or otherwise processed into small particulates as a result of the rotation of the grinding mechanism relative to a stationary cutter ring extending around the outer perimeter of the grinding mechanism.

Typically, the flow of water/waste discharged from a waste disposal is directed straight through a common wastewater pipe of the associated plumbing and expelled from the corresponding residence or building. As a result, the processed waste exiting the waste disposal is not currently being utilized for any purpose and, thus, provides no meaningful value to a user of the waste disposal.

Accordingly, an under-sink waste processing unit that allows for the processed waste expelled from a waste disposal to be further processed to create a useful end-product would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to an under-sink waste processing unit. The waste processing unit may generally include a housing defining an inlet and an outlet. The inlet may be configured to receive water and waste discharged from a waste disposal. The housing may also define a separation chamber in fluid communication with the inlet and a processing chamber separate from the separation chamber. The waste processing unit may also include a rotatable drive shaft extending within the separation chamber and a screw thread associated with the drive shaft. The screw thread may be configured to be rotated with the drive shaft within the separation chamber so as to at least partially separate the water from the waste received within the inlet. The separated waste may be configured to be dispersed from the separation chamber into the processing chamber for further processing thereof.

In another aspect, the present subject matter is directed to a separation device for separating water and waste received from a waste disposal. The separation device may generally include a housing defining an inlet, a water outlet and a waste outlet. The inlet may be configured to receive water and waste discharged from the waste disposal. The housing may also define a separation chamber between the inlet and the water and waste outlets. The separation device may also include a plunger at least partially defining a floor of the separation chamber. The plunger may be associated with a spring configured to apply a biasing force against the plunger that biases the plunger into sealing engagement with a wall of the separation chamber. In addition, the separation device may include a rotatable drive shaft extending within the separation chamber and a screw thread associated with the drive shaft. The screw thread may be configured to be rotated with the drive shaft within the separation chamber so as to separate the water from the waste received within the inlet. Moreover, the screw thread may be further configured to press the separated waste downward towards the plunger when the drive shaft is being rotated. The separated waste may be configured to be dispersed from the separation chamber via the waste outlet and the separated water may be configured to be dispersed from the separation chamber via the water outlet.

In a further aspect, the present subject matter is directed to a system for processing waste within a storage space defined under a sink. The system may generally include a waste disposal in fluid communication with the sink so as to receive water and waste discharged from the sink and a waste processing unit in fluid communication with the waste disposal. The waste processing unit may generally include a housing defining an inlet and an outlet. The inlet may be configured to receive water and waste discharged from the waste disposal. The housing may also define a separation chamber in fluid communication with the inlet and a processing chamber separate from the separation chamber. The waste processing unit may also include a rotatable drive shaft extending within the separation chamber and a screw thread associated with the drive shaft. The screw thread may be configured to be rotated with the drive shaft within the separation chamber so as to at least partially separate the water from the waste received within the inlet. The separated waste may be configured to be dispersed from the separation chamber into the processing chamber for further processing thereof.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an under-sink waste processing unit. Specifically, in several embodiments, the waste processing unit may be configured to receive water and waste discharged from an associated waste disposal. For example, water/waste draining from a kitchen sink or other suitable sink may be directed into the waste disposal, within which the waste is ground, shredded, cut and/or otherwise processed into small particulates. The water/waste may then be discharged from the waste disposal and delivered to the disclosed waste processing unit for further processing. In particular, in several embodiments, the waste processing unit may be configured to implement a dual-stage process in which the water and waste received from the waste disposal are initially separated from one another within the processing unit during a first stage of the process, with the separated waste then being further processed during the second stage of the process. As will be described below, such further processing may correspond to, for example, decomposition of the separated waste into compost and/or heating of the separated waste to create a desired end-product. For instance, heating may be used to simply dehydrate the separated waste or to apply a gasification process within which the hydrocarbons contained within the waste are broken down or cracked.

Figure 1:
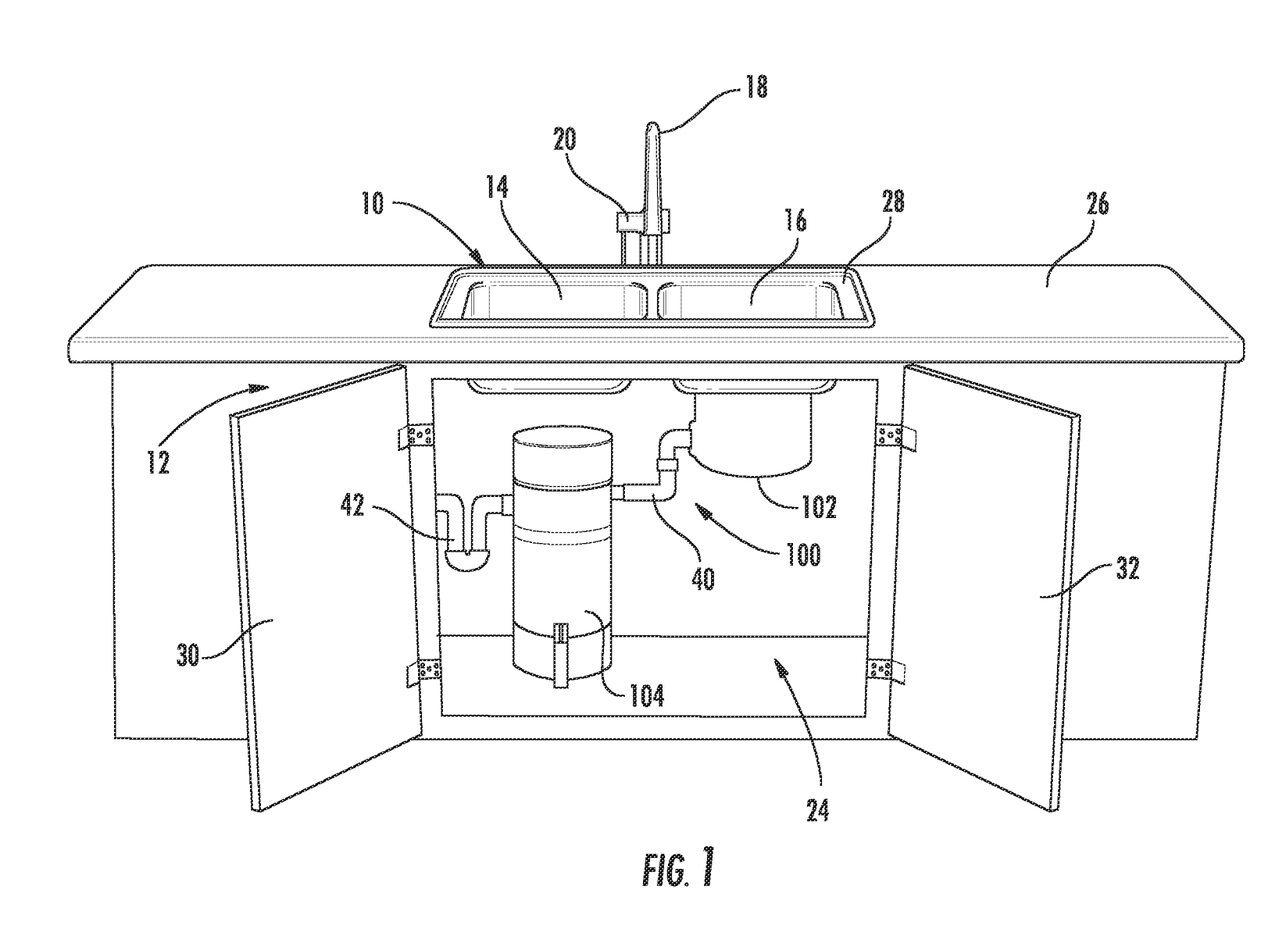
FIG. 1 illustrates a perspective view of a kitchen sink and associated under-sink cabinetry, particularly illustrating an under-sink waste processing unit installed within the under-sink storage space of the cabinetry that is configured to receive water and waste from an associated waste disposal in accordance with aspects of the present subject matter.

Referring now to the drawings, FIG. 1 illustrates a perspective view of one embodiment of a kitchen sink 10 and associated under-sink cabinetry 12 in accordance with aspects of the present subject matter. As shown, the sink 10 is configured as a dual-bowl sink. Thus, the sink 10 includes a left or first sink bowl 14 and a right or second sink bowl 16 positioned side-by-side. However, in other embodiments, the sink 10 may have any other suitable configuration, such as by being configured as a single-bowl sink. As shown in FIG. 1, a faucet 18, a knob(s) 20 and/or any other suitable accessories may be associated with the sink 10.

In several embodiments, the sink 10 may be supported vertically above an under-sink storage space 24 via a countertop 26 and the associated cabinetry 12. Specifically, the sink 10 may include an outer rim 28 extending around its periphery that is configured to be engaged against the countertop 26 such that the sink bowls 14, 16 are received within a corresponding sink opening (not shown) defined in the countertop 26. The countertop 26 may, in turn, be positioned atop the cabinetry 12 such that cabinet doors 30, 32 associated with the cabinetry 12 may be utilized to access the under-sink storage space 24. For example, as shown in FIG. 1, the cabinetry 12 may include a left or first cabinet door 30 for providing direct access to a left portion of the under-sink storage space 24. Additionally, the cabinetry 12 may include a right or second cabinet door 32 for providing direct access to a right portion of the under-sink storage space 24. In such an embodiment, each cabinet door 30, 32 may be selectively opened and closed to access and close-off, respectively, the under-sink storage space 24. In other embodiments, the cabinetry 12 may have any other suitable number of cabinet doors for accessing the under-sink storage space 24, such as a single cabinet door or three or more cabinet doors.

Additionally, as shown in FIG. 1, a system 100 for processing waste received from the sink 10 may be installed within the under-sink cabinetry 12. As shown, the system 100 may include a waste disposal 102 positioned within the under-sink storage space 24. As shown in the illustrated embodiment, the waste disposal 102 is mounted in fluid communication with the second sink bowl 16. As such, water and/or waste discharged from the second sink bowl 16 may be processed by the waste disposal 102 and subsequently discharged therefrom via a suitable disposal discharge pipe 40. However, in alternative embodiments, the waste disposal 102 may be mounted in fluid communication with the first sink bowl 14.

As is generally understood, while the sink 10 is being used, water and waste (e.g., food waste and other solid waste) may collect within the sink bowl 16 and may be subsequently discharged therefrom via a corresponding sink drain (not shown). The water and waste flowing through the drain may then be directed into the waste disposal 102, wherein the waste may be processed into fine particulates using a suitable grinding mechanism internal to the disposal 102. The water and processed waste may then be discharged from the waste disposal 102 into the associated discharge pipe 40.

Additionally, in accordance with aspects of the present subject matter, the disclosed system 100 may also include an under-sink waste processing unit 104 provided in fluid communication with the waste disposal 102. Specifically, as shown in FIG. 1, the waste processing unit 104 may be fluidly connected to the waste disposal 102 via the disposal discharge pipe 40. As a result, water and waste discharged from the waste disposal 102 may be directed through the discharge pipe 40 and into the waste processing unit 104. As will be described below, the water may then be separated from the waste and removed from the processing unit 104. For example, the water may be discharged from the processing unit 104 and flow into a corresponding outlet pipe 42 that is coupled to a common wastewater pipe (not shown) of the associated residential or building plumbing. The separated waste may then be processed, such as by allowing the waste to decompose within the processing unit 104 or by heating the waste to dehydrate and/or gasify the waste. The resulting processed waste may then be removed from waste processing unit 104 and utilized in any suitable manner. For instance, when the waste is decomposed, the processed waste may be utilized as compost for gardens, plants or vegetation.

Figure 2:
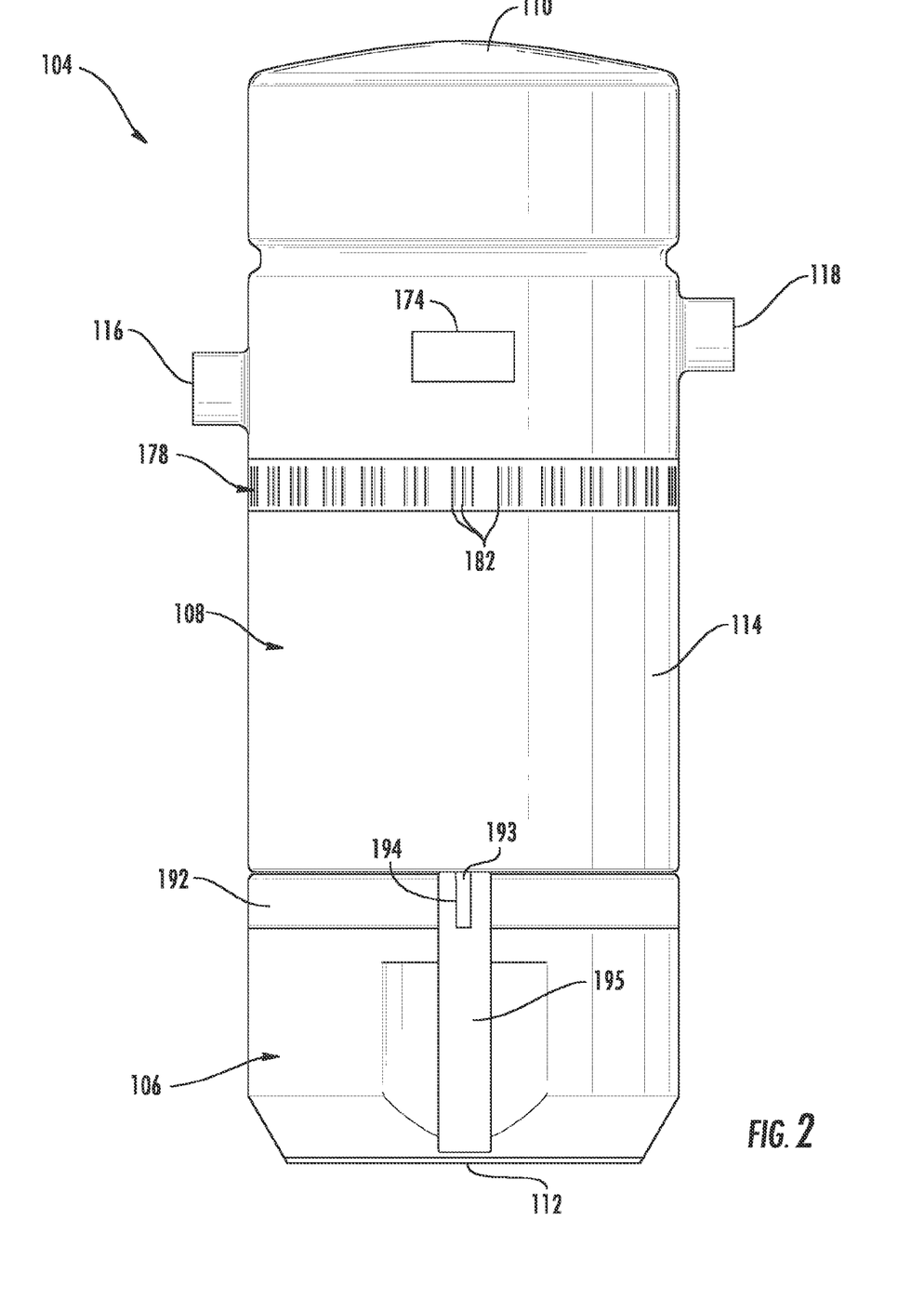
FIG. 2 illustrates a side view of one embodiment of a waste processing unit in accordance with aspects of the present subject matter.
Figure 3:
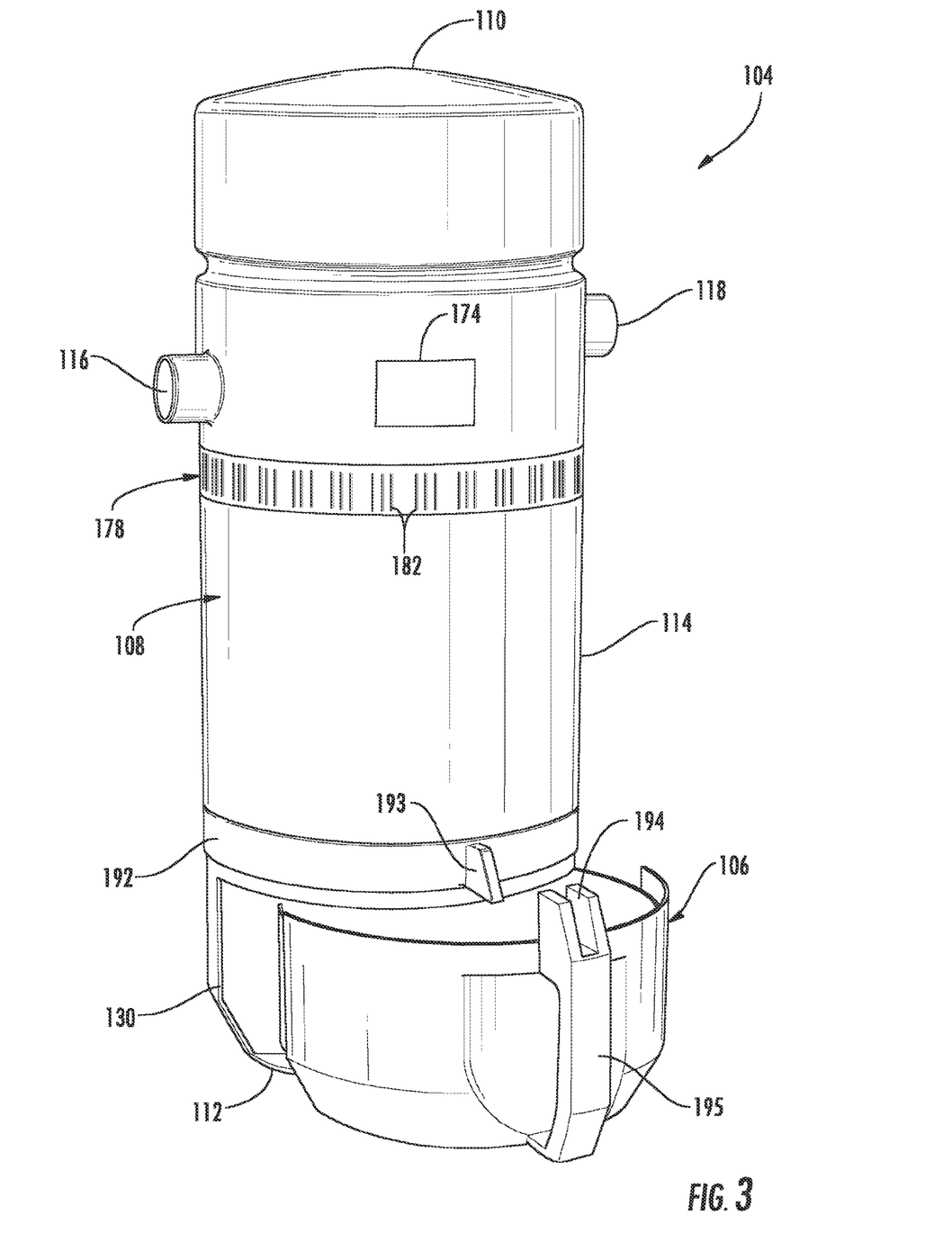
FIG. 3 illustrates a perspective view of the waste processing unit shown in FIG. 2, particularly illustrating a removable storage vessel of the unit being partially removed therefrom.
Figure 4:
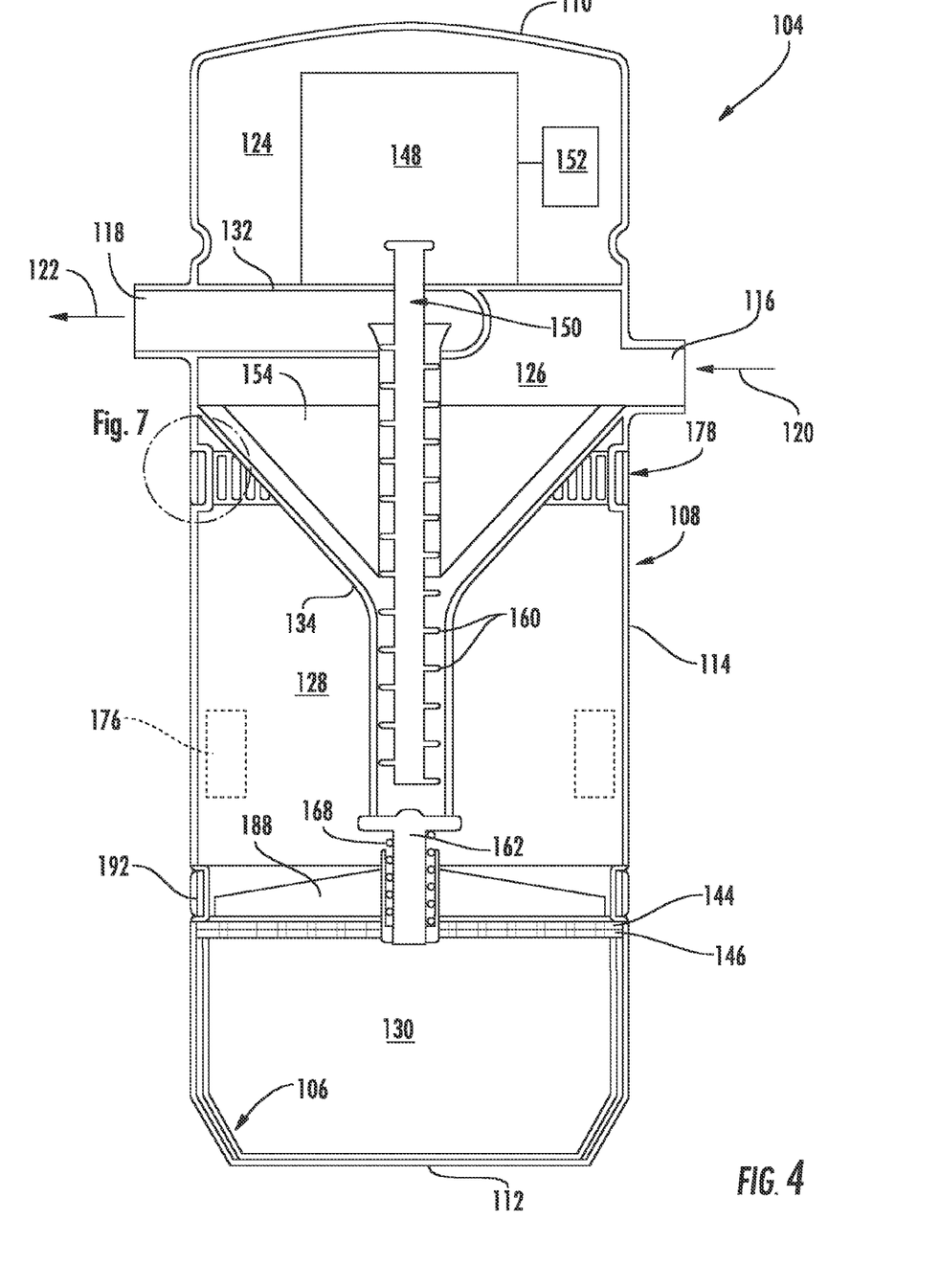
FIG. 4 illustrates a cross-sectional view of the waste processing unit shown in FIG. 2.
Figure 5:
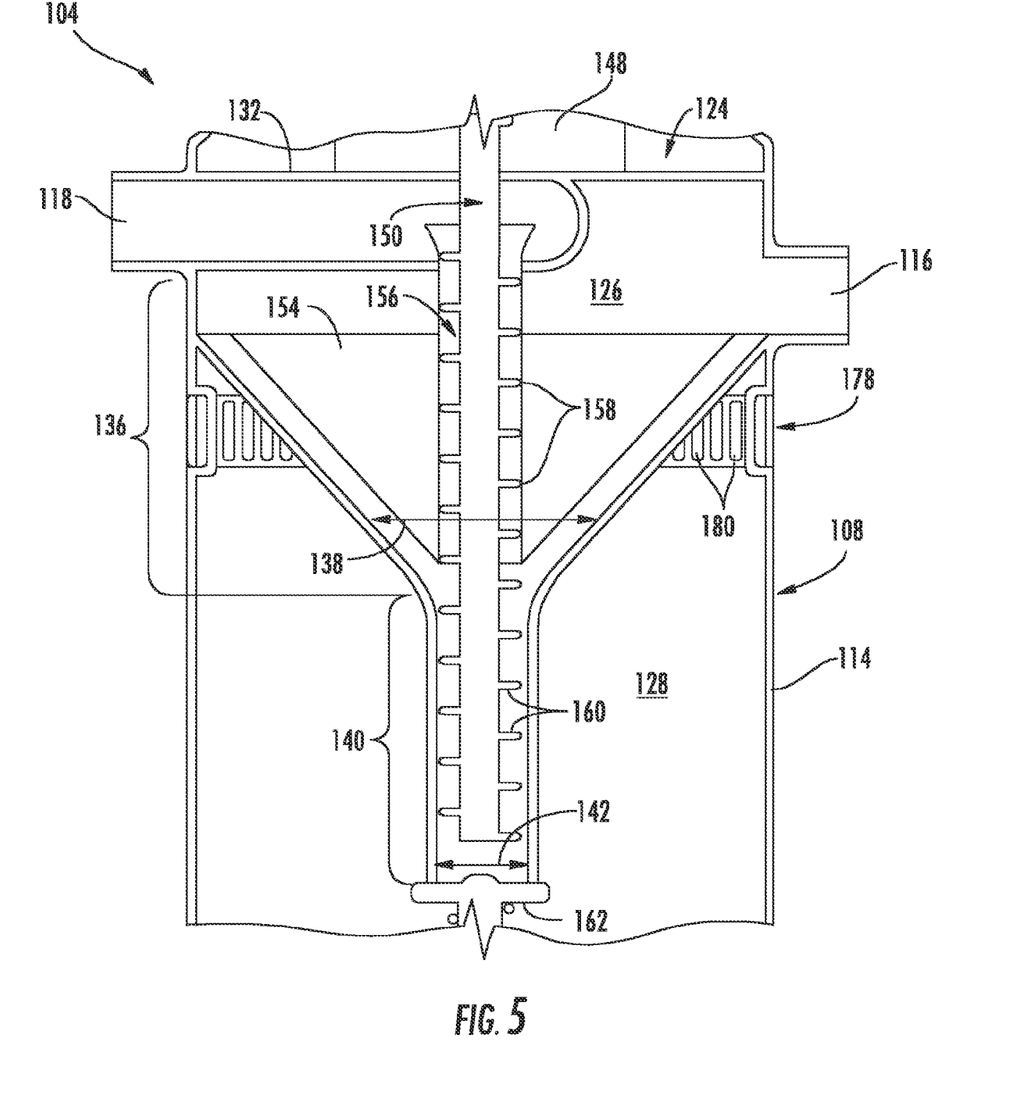
FIG. 5 illustrates a close-up, cross-sectional view of a central section of the waste processing unit shown in FIG. 4.
Figure 6:
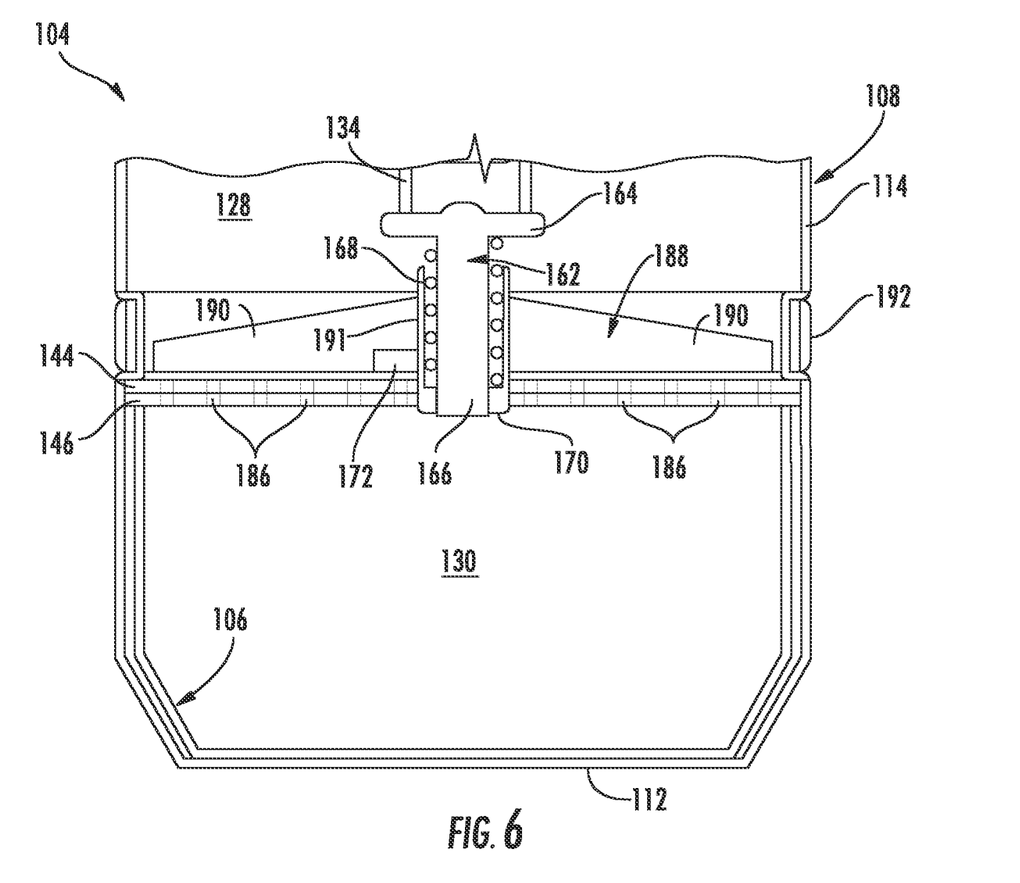
FIG. 6 illustrates a close-up, cross-sectional view of a lower section of the waste processing unit shown in FIG. 4.
Figure 7:
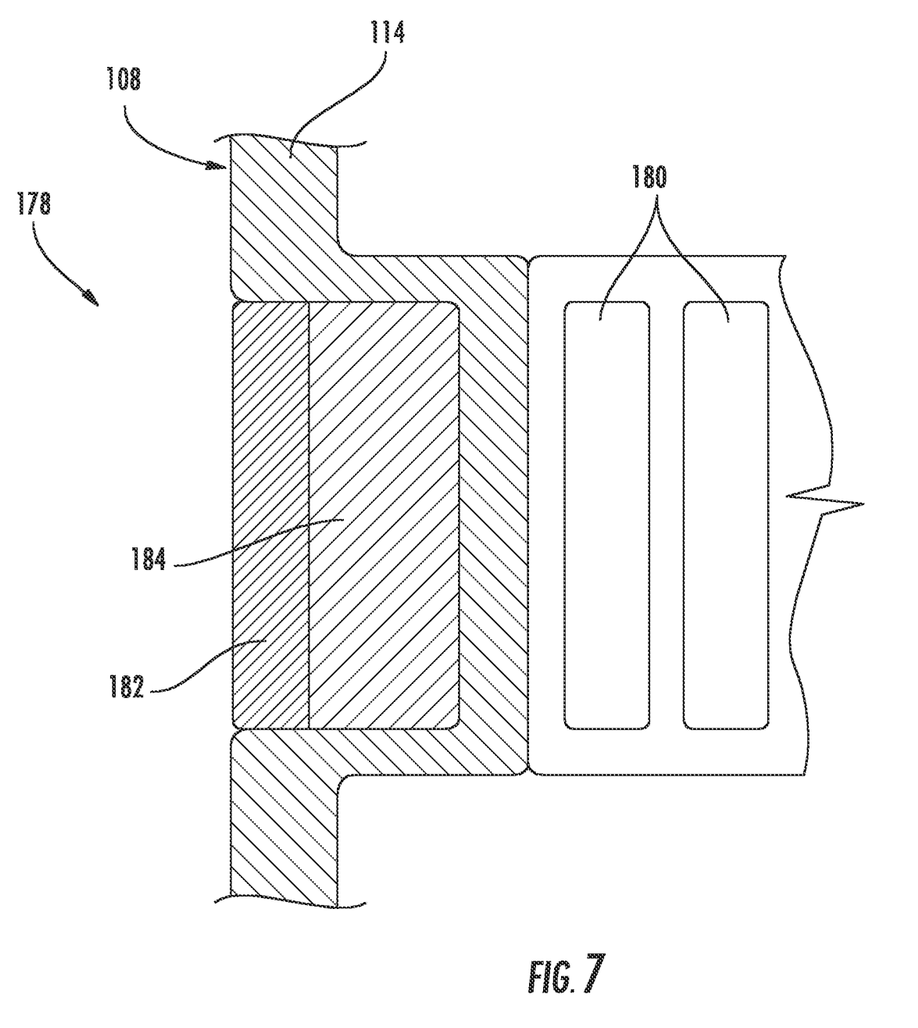
FIG. 7 illustrates a close-up, cross-sectional view of the portion of the waste processing unit contained within the dashed circle shown in FIG. 4.

Referring now to FIGS. 2-7, several views of one embodiment of the under-sink waste processing unit 104 described above with reference to FIG. 1 are illustrated in accordance with aspects of the present subject matter. In particular, FIG. 2 illustrates a side view of the waste processing unit 104 and FIG. 3 illustrates a perspective view of the waste processing unit 104 with a removable storage vessel 106 of the unit 104 being partially removed therefrom. FIG. 4 illustrates a cross-sectional view of the waste processing unit 104 shown in FIG. 2. Additionally, FIGS. 5-7 illustrate close-up, cross-sectional views of portions of the waste processing unit 104 shown in FIG. 4. For instance, FIG. 5 illustrates a close-up, cross-sectional view of a central section of the waste processing unit 104 and FIG. 6 illustrates a close-up, cross-sectional view of a lower section of the waste processing unit 104. Moreover, FIG. 7 illustrates a close-up, cross-sectional view of the portion of the waste processing unit 104 shown in the dashed circle of FIG. 4.

As shown in the illustrated embodiment, the waste processing unit 104 may include an outer housing 108 configured to encase or enclose the various internal components of the unit 104. In general, the housing 108 may have any suitable configuration and/or be made from any suitable material that allows it to function as described herein. For instance, as shown in the illustrated embodiment, the housing 108 may define a generally cylindrical shape formed by an upper housing wall 110, a lower housing wall 112 and a cylindrical outer sidewall 114 extending between the upper and lower housing walls 110, 112. Additionally, in one embodiment, the housing 108 may be formed from a lightweight, relatively rigid material(s), such as a suitable polymer material and/or aluminum.

As particularly shown in FIGS. 2-4, the housing 108 may also include both an inlet 116 and an outlet 118 defined through the outer sidewall 114. The inlet 116 may generally be configured to be in fluid communication with the waste disposal 102 described above, such as by coupling the inlet 116 to the disposal discharge conduit 40 shown in FIG. 1. As such, water and waste discharged from the waste disposal 102 may be directed into the waste processing unit 104 via the inlet 116 (e.g., as indicated by arrow 120 in FIG. 4). As will be described below, the water may then be separated from the waste and subsequently expelled from the waste processing unit 104 via the outlet 118. The water exiting the outlet 116 may then be directed through a suitable fluid conduit (e.g., outlet pipe 42 of FIG. 1) to a common wastewater pipe (not shown) of the associated residential or building plumbing (as indicated by arrow 122 in FIG. 4).

Additionally, the housing 108 may be configured to define one or more internal chambers. For example, in several embodiments, a motor chamber 124, a water/waste separation chamber 126, a processing chamber 128 and a waste collection chamber 130 may be defined within the interior of the housing 108. Specifically, as shown in FIG. 4, the motor chamber 124 may be defined between the upper housing wall 110, the outer sidewall 114 and an internal wall 132 extending radially inwardly from the outer sidewall 114 so as to separate the motor chamber 124 from the separation chamber 126. Similarly, as shown in FIGS. 4 and 5, the separation chamber 126 may be defined by the internal wall 132, the outer sidewall 114 and an internal sidewall 134 extending inwardly and downwardly from the outer sidewall 114 such that the separation chamber 126 includes an upper portion 136 (FIG. 5) defining a funnel-like shape having a tapering cross-sectional dimension 138 (FIG. 5) in the direction of the bottom of the waste processing unit 104 and a lower portion 140 (FIG. 5) defining a generally cylindrical shape having a substantially constant cross-sectional dimension 142 (FIG. 5). Additionally, as shown in FIG. 4, the processing chamber 128 may be defined by the outer sidewall 114, the internal sidewall 132 and one or more sifting plates 144, 146 extending radially inwardly from the outer sidewall 114 so as to separate the processing chamber 128 from the waste collection chamber 130. Moreover, as shown in FIGS. 4 and 6, the waste collection chamber 130 may be defined by the sifting plate(s) 144, 146, the outer sidewall 114 and the lower housing wall 112. As will be described in greater detail below, a removable storage vessel 106 may be configured to be received within the waste collection chamber 130, thereby allowing the processed waste to be removed from the unit 104.

As shown in FIG. 4, in several embodiments, the waste processing unit 104 may include a motor 148 housed within the motor chamber 124. In general, the motor 148 may be configured to be rotatably coupled to a drive shaft 150 extending lengthwise through the separation chamber 126. As will be described below, the drive shaft 150 may include one or more shaft features integrated therewith and/or coupled thereto for assisting in separating the water/waste received within the separation chamber 126 via the inlet 116.

It should be appreciated that the motor 148 may generally correspond to any suitable motor that is capable of imparting rotational motion to the drive shaft 150. For example, in several embodiments, the motor 148 may correspond to an electric motor. In such embodiment, a suitable power source (not shown) may be electrically coupled to the motor 148 for provided power thereto. Alternatively, the motor 148 may correspond to any other suitable motor known in the art It should also be appreciated that, in several embodiments, the motor 148 may be configured to be electronically controlled via a suitable controller 152. For instance, as shown in FIG. 4, the motor 148 may be communicatively coupled to a controller 152 housed within the motor chamber 124. In such an embodiment, the controller 152 may be configured to transmit suitable control signals for turning the motor 148 on and off. For example, in one embodiment, the controller 152 may be configured to turn the motor 148 on when it is detected that the waste disposal 102 is operating and thereafter, once the waste disposal 102 is turned off, wait a predetermined period of time before turning the motor 148 off. For instance, the controller 152 may be equipped with a timer or clocking device that allows the controller 152 to implement a delay period for turning the motor off after operation of the disposal 102 has been terminated. Alternatively, the controller 152 may be configured to turn the motor 148 on based on the amount of water/waste contained within the waste processing unit 104. For instance, a level sensor (not shown) may be positioned within the separation chamber 126 that detects when the amount of water/waste within the chamber 126 reaches a certain level. When it is detected that the water/waste has reached the predetermined level, the controller 152 may then turn on the motor 148 to allow for the amount of water within the waste processing unit 104 to be reduced and/or to allow the waste to be directed out of the separation chamber 126 (e.g., to the processing chamber 128).

Additionally, as shown in FIGS. 4 and 5, an upper section of the drive shaft 140 (e.g., the section extending within the upper portion 126 of the separation chamber 126) may include a flow propeller 154 formed thereon and/or coupled thereto. In general, the flow propeller 154 may be configured to be rotationally driven by the motor 148 (via the drive shaft 140) so as to create whirlpool environment within the separation chamber 126. Specifically, when a flow of water/waste is received within the separation chamber 126 via the inlet 116, the flow propeller 154 may be rotated at a sufficiently high RPM such that a whirlpool environment is created with the incoming water that forces the heavier waste particulates radially outwardly to the outside of the separation chamber 126. The waste particulates may then slide down the angled portions of the inner sidewall 134 along the upper portion 136 of the separation chamber 126 prior to being directed into the lower portion 140 of the separation chamber 126.

Moreover, as particularly shown in FIG. 5, a backflow channel 156 may be defined between the drive shaft 150 and the flow propeller 152 that is in fluid communication with the outlet 118. In several embodiments, a helically wound projection 158 may extend within the backflow channel 156 between the drive shaft 150 and the flow propeller 152 so as to create an archimidean screw-type mechanism that serves to direct water contained within the separation chamber 124 upwards towards the outlet 118. Specifically, due to rotation of the drive shaft 150 and the flow propeller 154 within the separation chamber 126, the water may be pulled to the center of the separation chamber 126 and may then be directed upward along the backflow chamber 156 via the archimidean screw-type mechanism provided by the helically wound projection 158. The water expelled from the top of the backflow chamber 156 may then be directed through the outlet 118 and discharged from the waste processing unit 104.

Moreover, as shown in FIG. 5, a lower section of the drive shaft 150 (e.g., the section extending within the lower portion 140 of the separation chamber 126) may include a screw thread 160 formed thereon and/or coupled thereto. In general, the screw thread 160 may be configured to form a press screw or auger-like mechanism along the drive shaft 150 that serves to press and compact the separated waste within the lower portion 140 of the separation chamber 126. Such compression of the waste may further separate any residual water remaining in the waste. The residual water may then be recirculated back up along the drive shaft 150 and may be expelled from the waste processing unit 140 via the backflow channel 156 and the outlet 118.

The separated waste contained within the lower portion 140 of the separation chamber 126 may be forced downwards via rotation of the screw thread 160 until the waste reaches the end of the drive shaft 150, at which point the waste may drop downward onto the bottom or floor of the separation chamber 126. As shown in FIGS. 4-6, in several embodiments, the floor of the separation chamber 126 may be formed at least partially by a plunger 162 configured to be biased against the inner sidewall 134 so as to provide a seal between the separation chamber 126 and the processing chamber 128. Specifically, as shown in FIG. 6, the plunger 162 may include an enlarged head 164 and a body 166 extending generally perpendicularly from the head 164. In such an embodiment, a spring 168 or other suitable biasing mechanism may be provided around the body 166 so as to bias the head 164 into sealing engagement with the bottom of the separation chamber 126. For example, as shown in FIG. 6, the spring 168 is compressed between the head 164 and a suitable wall 170 of the waste processing unit 104 such that spring 168 provides an upward biasing force against the head 164. As a result, when separated waste initially falls down onto the plunger head 164, the upward biasing force provided by the spring 168 may be sufficient to maintain the plunger head 164 in engagement with the inner sidewall 132. However, as the volume of waste contained within the separation chamber 126 increases, the corresponding increase in the downward pressure provided via rotation of the screw thread 160 may be sufficient to overcome the upward biasing force provided by the spring 168, thereby pushing the plunger 162 downward and allowing a portion of the waste contained at the bottom of the separation chamber 126 to be dispersed into the adjacent processing chamber 128.

As indicated above, the bottom or floor of the processing chamber 128 may be defined by one or more sifting plates 14, 146. Specifically, as shown in the illustrated embodiment, the waste processing unit 104 may include two adjacent sifting plates 144, 146 forming the bottom of the processing chamber 128, namely an upper sifting plate 144 and a lower sifting plate 146. Thus, when the plunger is pushed downwardly, the waste dispersed outwardly from the separation chamber 126 may fall onto the sifting plates 14, 146. The waste may then remain in the processing chamber 128 until processing is completed.

In several embodiments, the waste processing unit 104 may correspond to an under-sink composting unit configured to generate compost from the waste received within the processing chamber 128. In such embodiments, the waste may be allowed to decompose within the processing chamber 128 until the waste is converted into compost, at which point the compost may be removed from the waste processing unit 104 and utilized as a suitable fertilizer and/or soil amendment.

To enhance the decomposition process, the waste contained within the processing chamber 128 may be exposed to one or more decomposition agents and/or catalysts. For example, in one embodiment, the upper sifting plate 144 may be coated with a decomposition catalyst(s) that serves to increase the rate of decomposition of the waste. In such an embodiment, decomposition catalysts that may be used to coat the sifting plate 144 may include, but are not limited to, suitable metal oxides, such as platinum oxide and/or titanium oxide. In an alternative embodiment, the waste may be exposed to an ultraviolet (UV) light catalyst(s). For example, a suitable UV light source (not shown) may be provided within the processing chamber 128 that directs UV light towards the waste contained with the chamber 128.

Moreover, in embodiments in which the waste processing unit 104 is being used as composting unit, the waste processing unit 104 may also include a decomposition sensor 172 (FIG. 6) configured to monitor the decomposition of the waste. In general, the decomposition sensor 172 may correspond to any suitable sensor or sensing device that provides an indication of the decomposition of the waste. For example, as is generally understood, the decomposition process may be monitored via temperature, with ready compost typically having a temperature above a given threshold. In such an embodiment, the temperature of the decomposing waste may be continuously monitored to determine when the waste has been converted to compost. At such point, as will be described below, the decomposed waste/compost may be sifted out of processing chamber 128 and fall into the removable storage vessel 106 contained within the waste collection chamber 130.

It should be appreciated that the decomposition sensor 172 may generally be disposed at any suitable location within the waste processing unit 104 that allows the sensor 172 to monitor the decomposition of the waste. For example, as shown in FIG. 6, the decomposition sensor 172 is attached to or is otherwise located adjacent to the upper sifting plate 144. Alternatively, the decomposition sensor 172 may be mounted to or otherwise associated with any other suitable wall or component of the waste processing unit 104 that is contained within or positioned adjacent to the processing chamber 128 so as to allow the sensor 172 to monitor the decomposition of the waste.

Additionally, in several embodiments, the decomposition sensor 172 may be communicatively coupled to a suitable notification device 174 (FIG. 2) (e.g., via the controller 152) configured to provide a user of the waste processing unit 104 an indication that the waste has been converted to compost and, thus, may be removed from the unit 104. For example, when the decomposition sensor 172 corresponds to a temperature sensor, the temperature of the decomposing waste may be continuously transmitted to the controller 152. The controller 152 may, in turn, be configured to compare the monitored temperature to a predetermined temperature threshold corresponding to a temperature indicative of the waste being sufficiently decomposed. In such instance, when the monitored temperature reaches or exceeds the temperature threshold, the controller 152 may transmit a control signal to the notification device 174 so as to provide a suitable notification indicating that the decomposed waste/compost is ready to be removed.

It should be appreciated that the notification device 174 may generally correspond to any suitable device capable of providing the user with a notification that the compost is ready. For example, as shown in FIG. 2, in one embodiment, the notification device 174 may correspond to a digital display positioned on the exterior of the housing 108 that is configured to display a notification to the user (e.g., displayed text). In another embodiment, the notification device 174 may simply correspond to an indicator light that is configured to be illuminated when the compost is ready to be removed from the waste processing unit 104. In a further embodiment, the notification device 174 may correspond to a speaker or other suitable audio device configured to generate an audible notification (e.g., one or more beeps) indicating that the compost is ready to be removed.

In addition to allowing the waste contained within the processing chamber 128 to decompose, or as an alternative thereto, the waste may be processed in any other suitable manner. For example, in several embodiments, the waste may be heated within the processing chamber 128 in order to dehydrate and/or gasify the waste. In such embodiments, as shown in dashed lines in FIG. 4, the waste processing unit 104 may include a heating device 176 housed within the processing chamber 128 that allows the temperature within the chamber 128 to be increased, thereby providing a means for heating the waste. For example, in one embodiment, the heating device 176 may correspond to an electric heating element configured to radiate heat within the processing chamber 128.

It should be appreciated that, when heating the waste within the processing chamber 128, the exact temperature to which the waste must be heated may vary depending on the manner in which the waste is desired to be processed. For example, if the waste is simply being dehydrated, it may only be necessary to increase the temperature within the processing chamber to a first temperature threshold. However, if it desired for the waste to undergo a gasification process within the processing chamber 128, it may be necessary to increase the temperature to a second, higher temperature threshold so as to allow the hydrocarbons within the waste to break down or crack.

It should also be appreciated that, in addition to indicating the completion of the decomposition process (or as an alternative thereto), the notification device 174 described above may also be utilized to provide a notification to a user of the waste processing unit 104 that the heating process has been completed. For example, once the waste contained within the processing chamber 128 has been heated to a given temperature over a specific period of time, the notification device 174 may be configured to provide a notification (e.g., via a display, indicator light or audible signal) indicating that the waste has been processed and may be removed from the waste processing unit 104.

Additionally, in several embodiments, the waste processing unit 104 may include a filter assembly 178 provided in operative association with the processing chamber 128 to allow an airflow to circulate within the chamber 128 while preventing odors from being released from the unit 104. Specifically, as shown in the illustrated embodiment, the filter assembly 178 may include a ring of inner air vents 180 (FIGS. 5 and 7) and a ring of outer air vents 182 (FIGS. 2 and 3) separated from one another by a filter ring 184 (FIG. 7). In general, the filter ring 184 may be configured to absorb odors contained within the air exiting the waste processing unit 104 via the filter assembly 178. For example, in one embodiment, the filter ring 184 may correspond to a carbon filter or any other suitable filter including an odor control agent incorporated therein. As a result, as air passes through the filter assembly 178 from the inner air vents 180 to the outer air vents 182, odors contained within the air may be absorbed into and/or eliminated via the filter ring 184, thereby preventing such odors from being expelled to the exterior of the waste processing unit 104.

Referring still to FIGS. 2-7, once the waste has been sufficiently processed within the processing chamber 128 (e.g., via decomposition and/or heating), the resulting process waste may be sifted out of the processing chamber 128 via the sifting plates 144, 146, thereby allowing the waste to fall into the removable storage vessel 106 contained within the waste collection chamber 130. Specifically, in several embodiments, a plurality of openings 186 (FIG. 6) may be defined through each sifting plate 144, 146 that allow for the processed waste to be sifted out of the processing chamber 128. In such embodiments, when the waste is ready for removal, an internal sifter 188 positioned within the processing chamber 128 may be rotated relative to the sifting plates 142, 144, thereby breaking apart any compacted waste and allowing the waste to fall through the sifting plates 144, 146 and into the removable storage vessel 106. For example, as shown in FIG. 6, the sifter 188 may include a plurality of sifting arms 190 extending radially outwardly from a central hub 191 positioned around the plunger body 166. As such, by rotating the sifter 188 back and forth relative to the sifting plates 144, 146, the various sifting arms 190 may be moved across the sifting plates 144, 146 in a manner that directs the process waste through the openings 186 and into the waste collection chamber 130.

In several embodiments, to allow the internal sifter 188 to be rotated relative to the sifting plates 144, 146, the sifter 188 may be rotatable coupled to a sifter ring 192 extending around the outer perimeter of the housing 108. As particularly shown in FIGS. 2 and 3, the sifter ring 192 may, in turn, be configured to be rotationally engaged with the removable storage vessel 106. For example, as shown in the illustrated embodiment, the sifter ring 192 includes a tab 193 projecting outwardly from the ring 192 that is configured to be received within a corresponding cavity 194 defined by the storage vessel 106, such as at the top of a handle 195 formed on by storage vessel 106. As a result, when the storage vessel 106 is rotated relative to the housing 108 (e.g., by grasping the handle 195 and rotating the storage vessel 106 back and forth), the sifter ring 192 may rotate together with the storage vessel 106, which, in turn, results in rotation of the sifter 188. Such rotation of the sifter 188 may then allow for a sifting action to occur within the processing chamber 128 that results in the processed waste being directed through the openings 186 defined within the sifting plates 144, 146 and into the removable storage vessel 106. As shown in FIG. 3, the storage vessel 106 may then be removed from the waste processing unit 104 (e.g., by sliding the vessel 106 outwardly from the waste collection chamber 130) to allow the processed waste contained therein to be moved to another location.

It should be appreciated that, in several embodiments, the openings 186 defined through the sifting plates 144, 146 may be configured to be offset from one another when the storage vessel 106 is removed from the waste processing unit 104, thereby preventing further waste from dropping into the exposed waste collection chamber 130. For example, in one embodiment, one of the sifting plates 144, 146 may be configured to shift relative to the other sifting plate when the storage vessel 106 is removed to ensure that the openings 186 are offset relative to one another.

It should also be appreciated that, when the waste processing unit 104 is filled to capacity, the water/waste received from the waste disposal 102 via the inlet 116 may flow directly to the outlet 118, thereby bypassing the majority of the unit 104. As a result, the waste processing unit 104 may be prevented backing up and blocking the flow of waste/waste discharged from the waste disposal 102.

Figure 8:
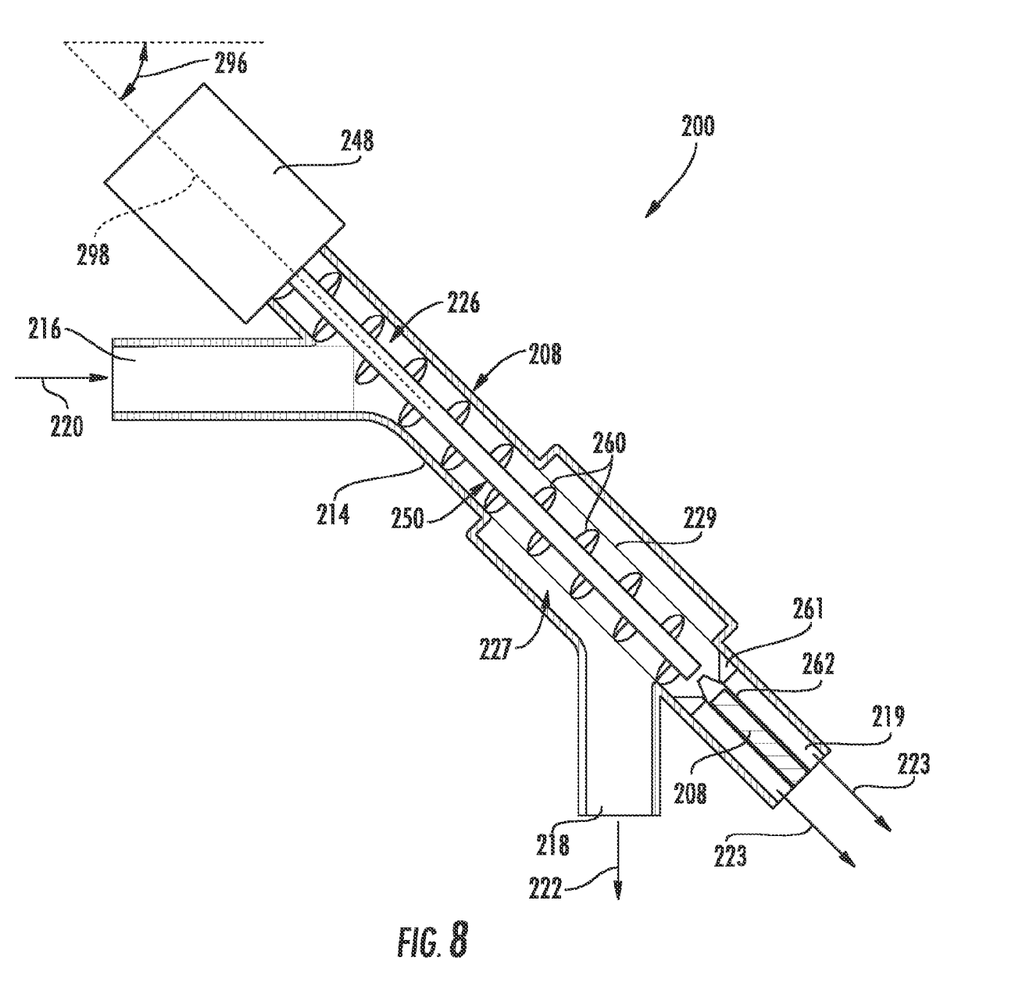
FIG. 8 illustrates a cross-sectional view of one embodiment of a water/waste separation device that may be utilized in accordance with aspects of the present subject matter to separate the water/waste received from a waste disposal.

As indicated above, in one embodiment, the drive shaft 150 may include a combination of a flow propeller 154 and a screw thread 160 to facilitate separating the water from the waste received within the separation chamber 126 via the inlet 116. However, in other embodiments, the water/waste received from the waste disposal 102 may be separated using any other suitable means. For instance, FIG. 8 illustrates one embodiment of an alternative water/waste separation device 200 that may be utilized within the disclosed waste processing unit 104 (or within any other suitable waste processing unit) in accordance with aspects of the present subject matter.

As shown, the separation device 200 may include an outer housing 208 configured to encase or enclose the various internal components of the device 200. In general, the housing 208 may have any suitable configuration that allows it to function as described herein. For instance, as shown in FIG. 8, the housing 208 may define a substantially cylindrical shape formed by an outer sidewall 214. In addition, the housing 108 may include an inlet 216 defined through the outer sidewall 214. In general, the inlet 216 may be configured to be in fluid communication with the waste disposal 102 described above, such as by coupling the inlet 216 to the disposal discharge conduit 40 shown in FIG. 1. As such, water and waste discharged from the waste disposal 102 may be directed into the separation device 200 via the inlet 216 (e.g., as indicated by arrow 220). Moreover, as shown in FIG. 8, the housing 208 may also include a water outlet 218 and a waste outlet 219 defined through the outer sidewall 214. Specifically, as will be described below, the water and waste received by the inlet 216 may be separated from one another within the separation device 200. The water may then be expelled from the device 200 via the water outlet 218 (e.g., as indicated by arrow 222) whereas the waste may be expelled from the device 200 via the waste outlet 219 (e.g., as indicated by arrows 223).

Additionally, the sidewall 214 may also be configured to define a separation chamber 226 extending between the inlet 216 and the outlets 218, 219. As such, water/waste flowing into the device 200 via the inlet 216 may be directed through the separation chamber 226 to be separated from one another prior to be expelled from the device 200 via the respective outlets 218, 219.

To allow for separation of the water/waste, the separation device 200 may include a motor 248 configured to be rotatably coupled to a drive shaft 250 extending lengthwise through the separation chamber 226. As shown in FIG. 8, the drive shaft 250 may include a screw thread 260 extending helically around the shaft 250 along its length. Similar to the embodiment described above, the screw thread 260 may be configured so as to form a screw press or auger-like mechanism along the length of drive shaft 250 that serves to press and compact the waste contained within the separation chamber 226. Thus, as the drive shaft 250 is rotated, the screw thread 260 may compress the waste as it is pushed downward towards the waste outlet 219, thereby squeezing out any water retained by the waste. The separated water may then be directed through the water outlet 218 and expelled from the separation device 200. For example, as shown in FIG. 9, in one embodiment, a portion of the outer sidewall 214 forming a lower section of the housing 208 may project outwardly from the driveshaft 250 so as to define an enlarged area 227 for collecting the water separated from the waste. In such an embodiment, a strainer screen 229 (e.g., a fine mesh screen) may be wrapped around the screw thread 260 along the length of the water collection area 227. The strainer screen 229 may be configured to allow water to pass therethrough while preventing waste from falling into the water collection area 227. The water passing through the screen 229 into the water collection area 227 may then be directed to the water outlet 218.

Additionally, the waste contained within the separation chamber 226 may continuously be forced downwards via rotation of the screw thread 260 until the waste reaches a bottom wall 261 the separation chamber 226. As shown in FIG. 8, in several embodiments, a plunger 262 may be configured to be biased against the bottom wall 261 of the separation chamber 226 (e.g., via a spring 268) so as to create a back pressure within the chamber 226 that assists in squeezing the water out of the waste. However, as the volume of waste contained within the separation chamber 226 increases, the corresponding increase in the downward pressure provided via rotation of the screw thread 260 may be sufficient to overcome the upward biasing force provided by the spring 268, thereby pushing the plunger 262 downward and allowing a portion of the waste contained within the separation chamber 226 to be expelled from the separation device 200 via the waste outlet 219.

It should be appreciated that, when the separation device 200 is being utilized within the disclosed waste processing unit 104, the waste outlet 219 may be connected to a suitable processing chamber (e.g., processing chamber 128 described above). As a result, the separated waste discharged from the separation chamber 226 may then be directed into the processing chamber for further processing. For example, as indicated above, the separated waste may be decomposed to create compost or may be heated to dehydrate and/or gasify the waste.

It should also be appreciated that, in several embodiments, the separation chamber 226 defined within the disclosed separation device 20 may be configured to be oriented at an angle 296 relative to horizontal. For example, as shown in FIG. 8, a central axis 298 of the separation chamber 226 (which may also correspond to the rotational axis of the drive shaft 250) may be orientated at an angle 296 relative to horizontal that ranges from about 20 degrees to about 70 degrees, such as from about 30 degrees to about 60 degrees or from about 40 degrees to about 50 degrees and any other subranges therebetween. Such an angled orientation of the separation chamber 226 may assist in the separating the water/waste contained within the chamber 226. For example, due to the angled orientation of the separation chamber 226, the water may be allowed to flow downward through the chamber 226 and drain through the strainer screen 229 even when the drive shaft 250 is not being rotated.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An under-sink waste processing unit, comprising:
   a housing defining an inlet and an outlet, the inlet being configured to receive water and waste discharged from a waste disposal, the housing further defining a separation chamber in fluid communication with the inlet and a processing chamber separate from the separation chamber;
   a rotatable drive shaft extending within the separation chamber; and
   a screw thread associated with the drive shaft, the screw thread being configured to be rotated with the drive shaft within the separation chamber so as to at least partially separate the water from the waste received within the inlet,
   wherein the separated waste is configured to be dispersed from the separation chamber into the processing chamber for further processing thereof,
   wherein a floor of the separation chamber is at least partially defined by a plunger configured to seal off the separation chamber from the processing chamber, the plunger being associated with a spring configured to apply a biasing force against the plunger that biases the plunger into sealing engagement with a wall of the separation chamber.

2. The under-sink waste processing unit of claim 1, further comprising a motor configured to rotationally drive the drive shaft.

3. The under-sink waste processing unit of claim 2, wherein the housing further defines a motor chamber that is separate from the separation chamber and the processing chamber, the motor being disposed within the motor chamber.

4. The under-sink waste processing unit of claim 1, further comprising a flow propeller associated with the drive shaft, the flow propeller being configured to be rotated with the drive shaft within the separation chamber so as to at least partially separate the water from the waste received within the inlet.

5. The under-sink waste processing unit of claim 4, further comprising a backflow channel defined between the drive shaft and the flow propeller, the backflow channel being in fluid communication with the outlet.

6. The under-sink waste processing unit of claim 5, further comprising a helical projection extending radially outwardly from the drive shaft within the backflow channel, wherein rotation of the drive shaft results in water being pulled through the backflow channel via the helical projection in the direction of the outlet.

7. The under-sink waste processing unit of claim 4, wherein the separation chamber comprises an upper portion and a lower portion, the flow propeller being disposed within the upper portion and the screw thread being disposed within the lower portion.

8. The under-sink waste processing unit of claim 1, wherein the screw thread is configured to press the waste downward towards the plunger when the drive shaft is being rotated such that the plunger is depressed when a pressure applied by the waste onto the plunger is sufficient to overcome the biasing force applied by the spring, wherein depression of the plunger allows for the waste to be dispersed from the separation chamber into the processing chamber.

9. The under-sink waste processing unit of claim 1, further comprising a filter assembly configured to filter odors generated within the processing chamber.

10. The under-sink waste processing unit of claim 1, wherein the housing further defines a waste collection chamber adjacent to the processing chamber, wherein a removable storage vessel is configured to be received within the waste collection chamber.

11. The under-sink waste processing unit of claim 10, further comprising at least one sifting plate separating the processing chamber from the waste collection chamber.

12. The under-sink waste processing unit of claim 1, wherein the waste is configured to be decomposed within the processing chamber.

13. The under-sink waste processing unit of claim 1, further comprising a heating device contained within the housing for heating the waste contained within the processing chamber.

14. A separation device for separating water and waste received from a waste disposal, the separation device comprising:
   a housing defining an inlet, a water outlet and a waste outlet, the inlet being configured to receive water and waste discharged from the waste disposal, the housing further defining a separation chamber extending between the inlet and the water and waste outlets;
   a plunger at least partially defining a floor of the separation chamber adjacent the waste outlet, the plunger being associated with a spring configured to apply a biasing force against the plunger that biases the plunger into sealing engagement with a wall of the separation chamber;
   a rotatable drive shaft extending within the separation chamber; and
   a screw thread associated with the drive shaft, the screw thread being configured to be rotated with the drive shaft within the separation chamber so as to separate the water from the waste received within the inlet, the screw thread being further configured to press the separated waste downward towards the plunger when the drive shaft is being rotated,
   wherein the separated waste is configured to be dispersed from the separation chamber via the waste outlet and the separated water is configured to be dispersed from the separation chamber via the water outlet.

15. The separation device of claim 14, further comprising a strainer screen disposed around the screw thread, the strainer screen being configured to allow the separated water to pass therethrough and flow into the water outlet.

16. An under-sink waste processing unit, comprising:
a housing defining an inlet and an outlet, the inlet being configured to receive water and waste discharged from a waste disposal, the housing further defining a separation chamber in fluid communication with the inlet and a processing chamber separate from the separation chamber, the housing defining a waste collection chamber adjacent to the processing chamber;
a rotatable drive shaft extending within the separation chamber; and
a screw thread associated with the drive shaft, the screw thread being configured to be rotated with the drive shaft within the separation chamber so as to at least partially separate the water from the waste received within the inlet,
wherein the separated waste is configured to be dispersed from the separation chamber into the processing chamber for further processing thereof,
wherein a removable storage vessel is configured to be received within the waste collection chamber.

17. The under-sink waste processing unit of claim 16, further comprising at least one sifting plate separating the processing chamber from the waste collection chamber.

18. The under-sink waste processing unit of claim 17, wherein the at least one sifting plate is coated with a decomposition catalyst.

19. The under-sink waste processing unit of claim 17, further comprising a sifter positioned within the processing chamber, the sifter being configured to be rotationally coupled to the removable storage vessel such that rotation of the removable storage vessel results in rotation of the sifter so as to direct processed waste within the processing chamber through a plurality of openings defined through the at least one sifting plate.

20. The under-sink waste processing unit of claim 19, wherein the sifter is rotationally coupled to the removable storage vessel via a sifter ring extending around an outer perimeter of the housing.

* * * * *